United States Patent
Lee

(10) Patent No.: US 7,994,913 B2
(45) Date of Patent: Aug. 9, 2011

(54) SYSTEMS AND METHODS FOR PREVENTING ACCESSORY LOSS

(75) Inventor: Kuan-Hsueh Lee, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 392 days.

(21) Appl. No.: 12/195,395

(22) Filed: Aug. 20, 2008

(65) Prior Publication Data

US 2009/0295573 A1    Dec. 3, 2009

(30) Foreign Application Priority Data

May 28, 2008   (CN) .......................... 2008 1 0301805

(51) Int. Cl.
*G08B 13/14* (2006.01)
(52) U.S. Cl. .................. 340/568.1; 340/529; 340/686.4; 340/691.5
(58) Field of Classification Search ............... 340/568.1, 340/568.6–568.8, 686.4, 309.16, 529, 571, 340/691.4–691.6
See application file for complete search history.

(56) References Cited

U.S. PATENT DOCUMENTS

| | | | | |
|---|---|---|---|---|
| 5,204,657 A | * | 4/1993 | Prosser et al. | 340/571 |
| 6,114,958 A | * | 9/2000 | Murphy | 340/568.1 |
| 6,518,957 B1 | * | 2/2003 | Lehtinen et al. | 345/173 |
| 7,248,231 B2 | * | 7/2007 | Hurley et al. | 345/2.1 |
| 2005/0264536 A1 | * | 12/2005 | Kyrola et al. | 345/173 |
| 2005/0270167 A1 | * | 12/2005 | Lai et al. | 340/309.16 |
| 2007/0063994 A1 | * | 3/2007 | Carlson et al. | 345/179 |
| 2008/0055278 A1 | * | 3/2008 | Locker et al. | 345/179 |

* cited by examiner

*Primary Examiner* — Thomas Mullen
(74) *Attorney, Agent, or Firm* — Frank R. Niranjan

(57) ABSTRACT

A system includes several functional modules to alert a user that an accessory has not been placed back into a bay of an electronic device after a predetermined time period. A sensor is configured for determining if the accessory has been received in the bay after the time period has expired. The sensor is further configured for generating a notification if the accessory has not been received in the bay after the time period has expired. An audio module is configured for receiving the notification, and transmitting an audio alarm via a speaker indicating that the accessory has not been received in the bay after the time period has expired. A display module is configured for receiving the notification, and displaying a graphic alarm on a display panel of the electronic device.

15 Claims, 3 Drawing Sheets

SYSTEMS AND METHODS FOR PREVENTING ACCESSORY LOSS

BACKGROUND

1. Field of the Invention

Embodiments of the present disclosure relate to systems and methods for managing an electronic device, and more particularly to a system and method for preventing loss of an accessory of the electronic device.

2. Description of Related Art

Currently, many electronic devices provide one or more input methods to input commands to the electronic devices. As an example, touch panels may be used to provide menu selections to access data or activate functions. A typical touch panel includes a sensing unit for detecting and locating contact made with a display panel. Many touch panel systems require use of a stylus for making contact with the display panel.

However, in keeping with the need for compact sizing to enhance portability of the device, the dimensions of the stylus are generally correspondingly small. While this allows convenient storage and transport of the stylus unit in a provided bay or other receptacle within a housing of the device, it also increases the likelihood that the stylus can be lost or misplaced if not immediately returned to its storage location following use. Such loss represents a considerable burden of inconvenience and cost to the user.

Accordingly, a system and method for preventing loss of electronic device accessories are desirable in order to overcome the limitations described.

SUMMARY

In one aspect, a system having a bay configured to receive and hold an accessory for preventing accessory loss for an electronic device is provided. The system includes a setting module, a detection module, an audio module, a display module and a processor that executes the setting module, the detection module, the audio module, and the display module. The setting module is configured for setting a time period for determining if the accessory has been received in the bay after the time period has expired. The detection module includes a timer and a sensor. The timer is configured for timing the time period upon the condition that the accessory has been removed from the bay. The sensor is configured for determining if the accessory has been received in the bay after the time period has expired. The sensor is further configured for generating a notification if the accessory has not been received in the bay after the time period has expired. The audio module is configured for receiving the notification, and transmitting an audio alarm alert via a speaker indicating that the accessory has not been received in the bay after the time period has expired. The display module is configured for receiving the notification, and displaying a graphic alarm alert on a display panel of the electronic device.

Other advantages and novel features of the present system and method for preventing the stylus from loss will become more apparent from the following detailed description of preferred embodiments when taken in conjunction with the accompanying drawings.

DETAILED DESCRIPTION OF CERTAIN INVENTIVE EMBODIMENTS

Figure 1:
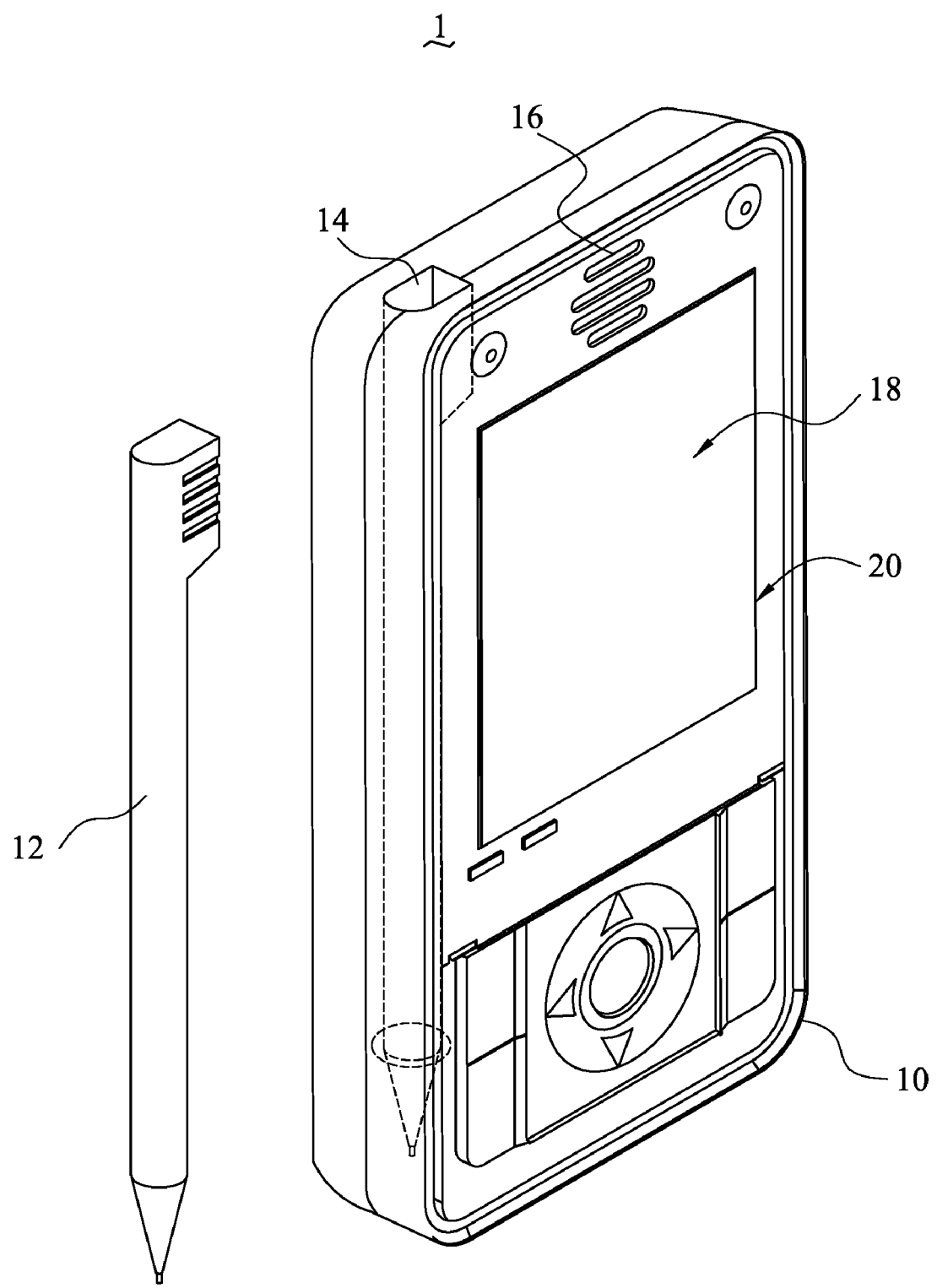
FIG. 1 is a block diagram of one embodiment of an electronic device, such as a mobile phone comprising a system for preventing accessory loss.

FIG. 1 is a block diagram of one embodiment an electronic device, such as a mobile phone 1 comprising a system 10 for preventing accessory loss. Depending on the embodiment, the mobile phone 1 may include other electronic devices, such as notebook computers, and personal digital assistants (PDAs), for example. In one embodiment, the mobile phone 1 includes an accessory, such as a stylus 12 used for inputting commands to the mobile phone 1. The mobile phone, in one embodiment, includes a bay 14, a speaker 16, a display panel 18, and a touch panel 20 arranged beneath the display panel 18.

The stylus 12 may contact with the touch panel 20 to access data or activate functions of the mobile phone 1. The bay 14 is configured to receive and hold the stylus 12 after operations utilizing the stylus 12 are finished. The stylus may be used with at least one of a device consisting of a touch panel, wireless earpiece-microphone unit, swappable SIM card, storage card or memory stick.

Figure 2:
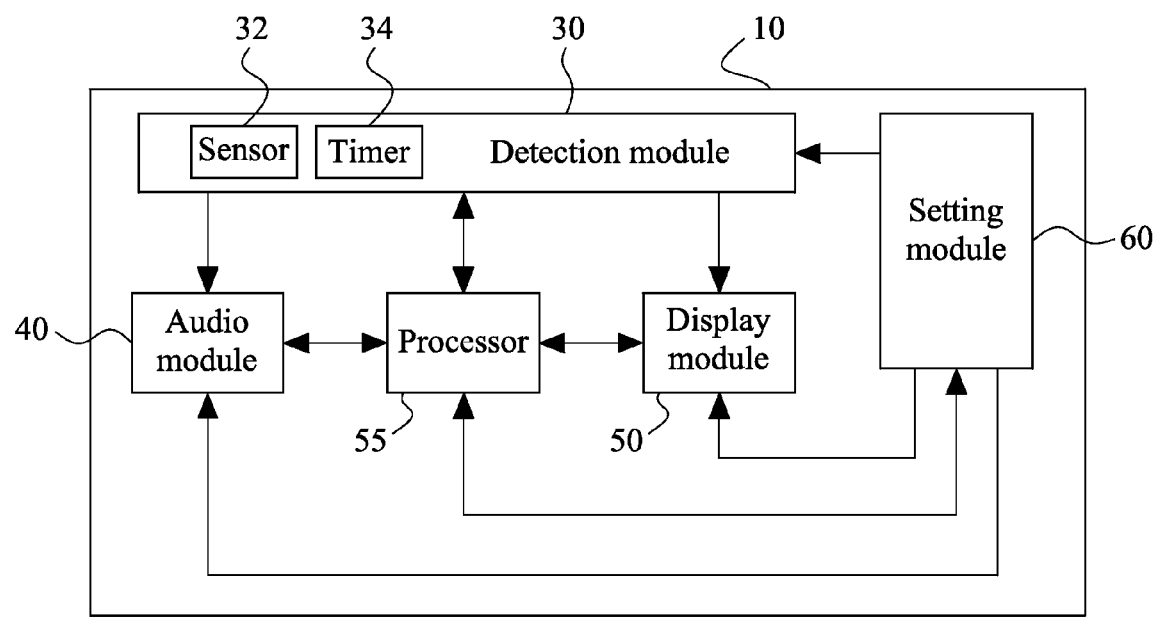
FIG. 2 is a functional block diagram of one embodiment of the system of FIG. 1.

FIG. 2 is a functional block diagram of one embodiment of the system of FIG. 1. In one embodiment, the system 10 includes a detection module 30, an audio module 40, a display module 50, and a setting module 60. The system 10 may include one or more specialized or general purpose processors, such as a processor 55 to execute the detection module 30, the audio module 40, the display module 50, and the setting module 60.

The setting module 60 is configured for setting a period (T1) for the detection module 30 to determine if the stylus 12 is in the bay 14 after the stylus 12 has been removed. In addition, the setting module 60 is also configured for setting an interval (T2) for the detection module 30 to continue detecting if the stylus 12 is in the bay 14, if the stylus 12 is not in the bay 14 after the period (T1). In one exemplary embodiment, the period (T1) and the interval (T2) have default values. For example, if the default value of the period (T1) is 10 minutes, and if the default value of the interval (T2) is 3 minutes, the detection module 30 determines if the stylus 12 is in the bay 14 after the stylus 12 has been removed for 10 minutes. If the stylus 12 is not in the bay 14 after the period (T1) has expired, the detection module 30 detects if the stylus 12 is in the bay 14 every 3 minutes. It is to be noted that the values of the period (T1) and the interval (T2) may be modified according to actual requirements.

The detection module 30 includes a sensor 32 and a timer 34. The sensor 32 is arranged in the bottom of the bay 14 and detects if the stylus 12 is in the bay 14. The timer 34 is activated when the stylus 12 is removed from the bay 14. After the period (T1) expires, the sensor 32 determines if the stylus 12 is in the bay 14. If the sensor 32 determines that the stylus 12 is not in the bay 14, the sensor 32 generates a notification to the audio module 40 and to the display module 50 notifying the modules 40, 50 that the stylus 12 is not in the bay 14. In addition, the sensor 32 continues detecting if the stylus 12 is in the bay 14 for the interval (T2) until determining that the stylus 12 has been received in the bay 14. Upon determining that the stylus 12 has been received in the bay 14, the sensor 32 generates a stop-notification to the audio module 40 and the display module 50.

The audio module 40 includes a speaker (not shown) which may be used to continuously play an alarm signal if the audio module receives the notification that the stylus has not been placed back into the bay 14. The audio module 40 is also configured to stop playing the audio alarm if the stop-notification has been received by the audio module 40. In addition, the audio alarm can be delayed or stopped by means of the setting module 60 when the audio module 40 is playing the audio alarm.

The display module 50 displays menus and application data (not shown) for the system 10. The display module 50 may display a graphic alarm on the display panel 18 of the system 10 indicating that the stylus has not been received in the bay 14 upon receiving the notification. The graphic alarm may be configured to not display after the display module 50 receives the stop-notification from the sensor 32. In addition, the graphic alarm can be delayed or stopped by means of the setting module 60 when the display module 50 is showing/displaying the graphic alarm.

In one exemplary embodiment, the sensor 32 generates the notification to the audio module 40 and the display module 50 at the same time after determining that the stylus 12 is not in the bay 14 after the period (T1) had expired. Thus, the audio alarm and the graphic alarm occur simultaneously. In alternative embodiments, when the sensor 32 determines that the stylus 12 is not in the bay 14 after the period (T1) expires, the notification is configured to be sent to only one of the audio module 40 and the display module 50.

The setting module 60 is also configured for setting a delay of the audio alarm and the graphic alarm. Additionally, customized audio and graphic content may be selected using the setting module 60. In one embodiment, the audio alarm and graphic alarm may be selected according to user input from the menu.

Figure 3:
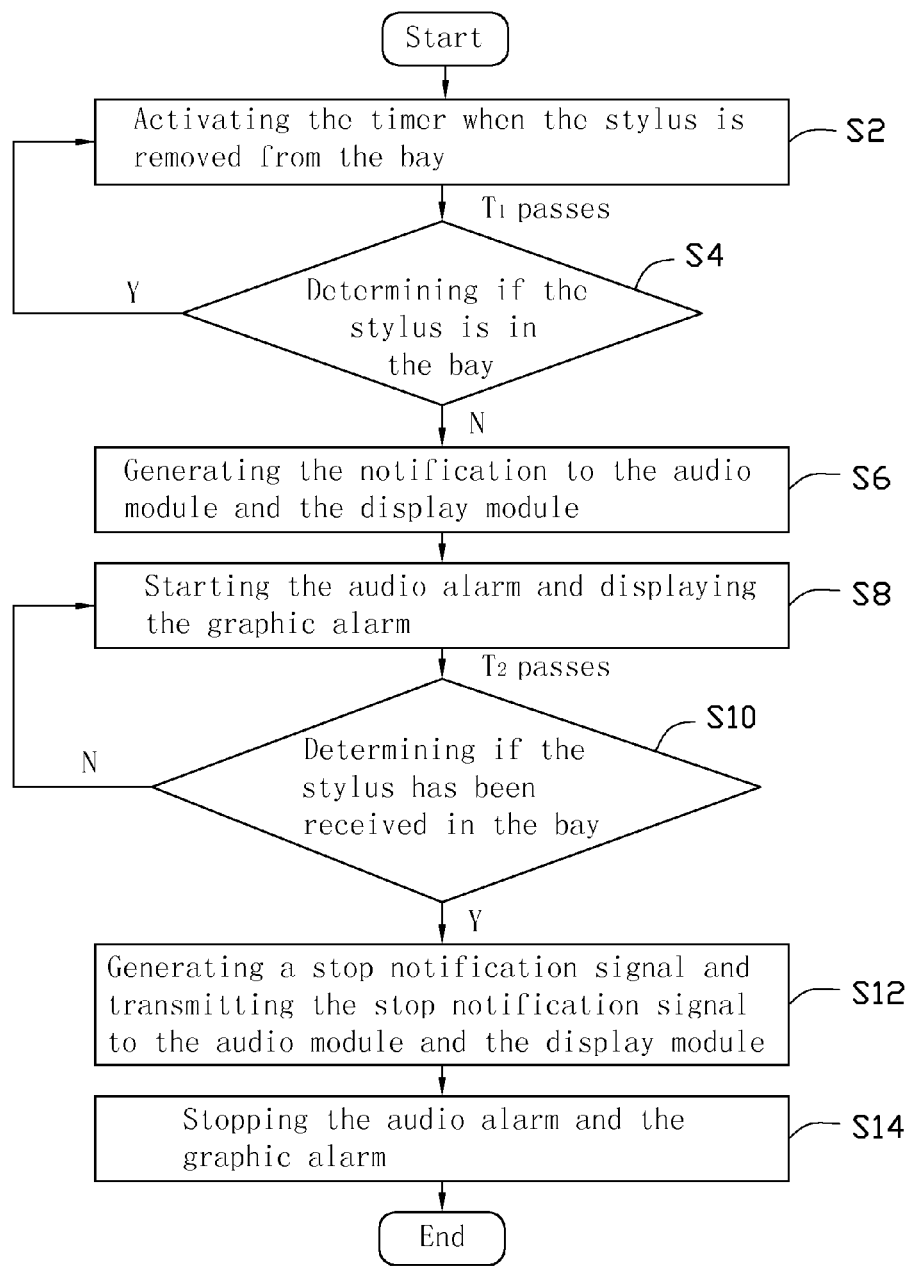
FIG. 3 is a flowchart illustrating one embodiment of a method for preventing accessory loss, such as the stylus for the system.

FIG. 3 is a flowchart illustrating one embodiment of a method for preventing accessory loss, such as the stylus 14 for the system 10. The method of FIG. 3 may be used when a user removes the stylus 14 from the system 10 in order to execute one or more operations of the system 10. Depending on the embodiment, additional blocks may be added or deleted and the blocks may be executed in an order other than that described. In block S2, the timer 34 is activated when the stylus 12 has been removed from the bay 14.

In block S4, the sensor 32 determines if the stylus 12 is in the bay 14 after the period (T1) expires. If the stylus 12 has been received in the bay 14 before the period (T1) expires, the process returns to block S2. Otherwise, if the stylus 12 has not been received in the bay 14, in block S6, the sensor 32 generates a notification to the audio module 40 and the display module 50.

In block S8, the audio module 40 plays an audio alarm and the display module 50 displays an graphic alarm indicating that the stylus has not been received in the bay after the period (T1) has expired. In block S10, the sensor 32 determines if the stylus 12 has been received in the bay 14 after the interval (T2) expires.

If the stylus 12 has been received in the bay 14, in block S12, the sensor 32 generates the stop-notification and transmits the stop-notification to the audio module 40 and the display module 50. If the stylus 12 has not been received in the bay 14, the procedure returns to block S8, and the audio module 40 and the display module 50 continue playing the respective alerts.

In block S14, the audio module 40 and the display module 50 respectively stop the audio alarm and the graphic alarm upon receiving the stop-notification.

It is to be noted that, while audio and graphic alarms are described here, the system and method of the disclosure can utilize any other type of notification, including but not limited to vibration of the unit and electronic transmission of the alert, while remaining well within the scope of the disclosure, without deviating from the spirit of the present disclosure.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A system for preventing accessory loss for an electronic device comprising a bay configured to receive and hold an accessory, the system comprising:
   a setting module configured for setting a time period for determining if the accessory is received in the bay when the time period expires, and for setting an interval to continue determining if the accessory is received in the bay upon determining that the accessory was not received in the bay when the time period expired;
   a detection module comprising a timer and a sensor, the timer configured for counting the time period when the accessory is removed from the bay, the sensor configured for determining if the accessory is received in the bay when the time period expires, the sensor further configured for generating a notification if the accessory is not received in the bay when the time period expires;
   an audio module configured for receiving the notification, and transmitting an audio alarm alert via a speaker of the electronic device indicating that the accessory is not received in the bay when the time period expires;
   a display module configured for receiving the notification, and displaying a graphic alarm alert on a display panel of the electronic device; and
   a processor that executes the operations of the setting module, the detection module, the audio module, and the display module.

2. The system as claimed in claim 1, wherein the sensor is further configured to continue determining if the accessory is received in the bay for successive intervals when the accessory is not received in the bay.

3. The system as claimed in claim 2, wherein the sensor is further configured for generating a stop-notification to the audio module and the display module upon determining that the accessory is received in the bay.

4. The system as claimed in claim 3, wherein the audio module is further configured for terminating transmission of the audio alarm upon receiving the stop-notification from the sensor.

5. The system as claimed in claim 3, wherein the display module is further configured for terminating display of the graphic alarm upon receiving the stop-notification from the sensor.

6. The system as claimed in claim 1, wherein the setting module is further configured for setting a default value of the time period, and modifying the default value of the time period.

7. The system as claimed in claim 1, wherein the accessory is a stylus for use with at least one apparatus consisting of a touch panel, a wireless earpiece-microphone unit, a swappable subscriber identity module (SIM) card, a storage card and a memory stick; and wherein the bay is integrally configured on the apparatus to receive or hold the respective accessory.

8. A computer-implemented method for preventing accessory loss for an electronic device comprising a bay configured to receive and hold an accessory, the method comprising:

setting a time period for determining if the accessory is received in the bay;

activating a timer upon the condition that the accessory is removed from the bay;

determining if the time period has expired;

determining if the accessory is received in the bay when the time period expires;

generating a notification and setting an interval to continue determining if the accessory is received in the bay upon determining that the accessory was not received in the bay when the time period expired;

receiving the notification and transmitting an audio alarm alert via a speaker of the electronic device; and receiving the notification and displaying a graphic alarm alert via a display panel on the electronic device.

9. The method as claimed in claim 8, further comprising:

continuing to determine if the accessory is received in the bay for successive intervals when the accessory is not received in the bay.

10. The method as claimed in claim 9, further comprising:

generating a stop-notification upon determining that the accessory is received in the bay.

11. The method as claimed in claim 10, further comprising:

terminating transmission of the audio alarm upon receiving the stop-notification.

12. The method as claimed in claim 10, further comprising:

terminating display of the graphic alarm upon receiving the stop-notification.

13. The method as claimed in claim 8, further comprising:

setting a default value of the time period.

14. The method as claimed in claim 13, further comprising:

modifying the default value of the time period.

15. The method as claimed in claim 8, wherein the accessory is a stylus for use with at least one apparatus consisting of a touch panel, a wireless earpiece-microphone unit, a swappable subscriber identity module (SIM) card, a storage card and a memory stick; and wherein the bay is integrally configured on the apparatus to receive or hold the respective accessory.

\* \* \* \* \*